(12) United States Patent
Ohtomo et al.

(10) Patent No.: US 9,201,422 B2
(45) Date of Patent: Dec. 1, 2015

(54) MEASURING SYSTEM

(71) Applicant: Kabushiki Kaisha TOPCON, Tokyo-to (JP)

(72) Inventors: Fumio Ohtomo, Saitama (JP); Kaoru Kumagai, Tokyo-to (JP); Kazuki Osaragi, Tokyo-to (JP); Hitoshi Otani, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 14/590,320

(22) Filed: Jan. 6, 2015

(65) Prior Publication Data

US 2015/0220085 A1    Aug. 6, 2015

(30) Foreign Application Priority Data

Jan. 31, 2014    (JP) .................................. 2014-017618

(51) Int. Cl.
*G05D 1/00*    (2006.01)
*G05D 3/00*    (2006.01)
(Continued)

(52) U.S. Cl.
CPC .............. *G05D 1/0011* (2013.01); *G01S 19/13* (2013.01)

(58) Field of Classification Search
CPC ............... G07C 5/008; G07C 9/00309; G07C 2009/00793; B60R 25/24; F02N 11/0807
USPC ............................................................ 701/2
See application file for complete search history.

(56) References Cited

U.S. PATENT DOCUMENTS 6,369,755 B1    4/2002    Nichols et al.
2005/0286760 A1    12/2005    Ohtomo et al.
(Continued)

FOREIGN PATENT DOCUMENTS

CA    2832956 A1    10/2012
EP    0051913 A1    5/1982
(Continued)

OTHER PUBLICATIONS

European communication mailed Feb. 6, 2015 in co-pending European patent application No. 14171346.1.
(Continued)

*Primary Examiner* — Maceeh Anwari
(74) *Attorney, Agent, or Firm* — Nields, Lemack & Frame, LLC (57) ABSTRACT

The invention provides a measuring system comprising a remotely controllable flying vehicle system with a GPS device and a measuring device installed thereon, a position measuring device installed at an arbitrary position and able to measure distance and angle and to track, a ground base station for controlling a flight of a flying vehicle, a remote controller able to give and take data to and from the ground base station and able to perform wireless communication to and from the flying vehicle system, and a control unit provided on the flying vehicle system or the ground base station, wherein the flying vehicle system has a retro-reflector as an object to be measured and the position measuring device is constructed so as to track the retro-reflector and perform distance measurement and angle measurement, wherein the flying vehicle system obtains GPS coordinates by the GPS device at least at two points during flight, the position measuring device measures positions of the two points of the flying vehicle system from an installation point, wherein the position measuring device measures positions of the flying vehicle system at the two points from the installation points, and either one of the control units are configured so as to obtain an absolute coordinate or GPS coordinate of the installation point of the position measuring device based on the GPS coordinates of the two points and based on distance measurement results and on angle measurement results by the position measuring device.

6 Claims, 8 Drawing Sheets

(51) Int. Cl.
*G06F 7/00* (2006.01)
*G06F 17/00* (2006.01)
*G01S 19/13* (2010.01)

(56) References Cited

U.S. PATENT DOCUMENTS

| | | |
|---|---|---|
| 2007/0265728 A1 | 11/2007 | Marsh et al. |
| 2008/0075325 A1 | 3/2008 | Otani et al. |
| 2010/0033371 A1 | 2/2010 | Kumagai et al. |
| 2014/0371952 A1 | 12/2014 | Ohtomo et al. |
| 2015/0116693 A1 | 4/2015 | Ohtomo et al. |

FOREIGN PATENT DOCUMENTS

| | | |
|---|---|---|
| EP | 2064521 A1 | 6/2009 |
| EP | 2511781 A1 | 10/2012 |
| JP | 5-118850 A | 5/1993 |
| JP | 8-285588 A | 11/1996 |
| JP | 2002-6424 A | 1/2002 |
| JP | 2006-10376 A | 1/2006 |
| JP | 2008-76303 A | 4/2008 |
| JP | 2008-76405 A | 4/2008 |
| JP | 2010-38822 A | 2/2010 |
| WO | 2008/030330 A1 | 3/2008 |
| WO | 2008/067349 A2 | 6/2008 |
| WO | 2008/124713 A2 | 10/2008 |
| WO | 2012/049438 A1 | 4/2012 |

OTHER PUBLICATIONS

IEEE, Proceedings of SICE Annual Conference 2010, Aug. 18-21, 2010, "Control System Design for Visual Based Indoor Inspection Helicopter", pp. 811-816, Higuchi, et al.

European communication dated Mar. 26, 2015 in co-pending European patent application No. 14189220.8.

European communication dated Apr. 1, 2015 in corresponding European patent application No. 15151179.7.

MEASURING SYSTEM

BACKGROUND OF THE INVENTION

The present invention relates to a measuring system, which performs measurement on a structure or the like using an unmanned aerial vehicle (UAV).

In recent years, with the progress of UAV (Unmanned Aerial Vehicle), various types of apparatuses are installed on the UAV and operations as required are carried out by remotely controlling the UAV or by automatically flying the UAV. For instance, a camera for photogrammetry and a scanner are installed on the UAV, and measurement from up in the sky toward a position at lower level is performed or measurement is performed at a place where no operator can enter. Further, for the positional measurement of the UAV itself, a GPS device is installed on the UAV, and a position of the UAV is measured by using the GPS device.

However, at a side of a dam or a building or at a place under a bridge, radio waves from artificial satellites cannot be received and positional measurement of the UAV cannot be performed. For this reason, there have been problems in that remote control of the UAV could not be carried out or measurement by the UAV could not be performed.

SUMMARY OF THE INVENTION

It is an object of the present invention to provide a measuring system, which enables a remote control and an automatic flight of a UAV even under an environment where radio waves from artificial satellites cannot be received and which enables a measurement on structures such as building, dam, etc. even at a place or in an environment where measurement cannot be performed by a UAV where camera for photogrammetry, scanner and spectral camera are installed.

To attain the object as described above, a measuring system according to the present invention comprises a remotely controllable flying vehicle system with a GPS device and a measuring device installed thereon, a position measuring device installed at an arbitrary position and able to measure distance and angle and to track, a ground base station for controlling a flight of a flying vehicle, a remote controller able to give and take data to and from the ground base station and able to perform wireless communication to and from the flying vehicle system, and a control unit provided on the flying vehicle system or the ground base station, wherein the flying vehicle system has a retro-reflector as an object to be measured and the position measuring device is constructed so as to track the retro-reflector and perform distance measurement and angle measurement, wherein the flying vehicle system obtains GPS coordinates by the GPS device at least at two points during flight, the position measuring device measures positions of the two points of the flying vehicle system from an installation point, wherein the position measuring device measures positions of the flying vehicle system at the two points from the installation points, and either one of the control units are configured so as to obtain an absolute coordinate or GPS coordinate of the installation point of the position measuring device based on the GPS coordinates of the two points and based on distance measurement results and on angle measurement results by the position measuring device.

Further, in the measuring system according to the present invention, the control unit controls the flight of the flying vehicle system based on the absolute coordinates or on the GPS coordinates.

Further, in the measuring system according to the present invention, the measuring device is a shape measuring device for measuring a shape of an object to be measured, and the control unit obtains coordinates of the shape of the object to be measured based on a shape of an object to be measured obtained by the shape measuring device at a measuring position and based on absolute coordinates of the measuring position obtained by converting measurement results of the position measuring device or on GPS coordinates obtained by the GPS device.

Further, in the measuring system according to the present invention, the measuring device is a camera, and the control unit performs photogrammetry on an object to be measured based on an image of the object to be measured acquired by the camera at least at two points during flight, and based on absolute coordinates or GPS coordinates of the two points obtained by converting measurement results of the position measuring device or based on absolute coordinates or GPS coordinates of the two points obtained by the GPS device.

Further, in the measuring system according to the present invention, the position measuring device is installed at two or more arbitrary points, the control unit obtains absolute coordinates or GPS coordinates of each of the installation points of the position measuring device, performs measurement by the position measuring device from each of the installation points, converts the obtained measurement results to absolute coordinates or GPS coordinates respectively and integrates the measurement results obtained by the measurement from each of the installation points.

Furthermore, in the measuring system according to the present invention, the measuring device of the flying vehicle system determines a dead angle range of the position measuring device, the position measuring device measures a range where it is impossible to fly of the flying vehicle system or a range where it is impossible to perform positional measurement by the GPS device, the control unit converts the measurement results of the position measuring device to GPS coordinates or absolute coordinates and integrates the results measured by the measuring device of the flying vehicle system and the result of measurement by the position measuring device.

According to the present invention, the measuring system comprises a remotely controllable flying vehicle system with a GPS device and a measuring device installed thereon, a position measuring device installed at an arbitrary position and able to measure distance and angle and to track, a ground base station for controlling a flight of a flying vehicle, a remote controller able to give and take data to and from the ground base station and able to perform wireless communication to and from the flying vehicle system, and a control unit provided on the flying vehicle system or the ground base station, wherein the flying vehicle system has a retro-reflector as an object to be measured and the position measuring device is constructed so as to track the retro-reflector and perform distance measurement and angle measurement, wherein the flying vehicle system obtains GPS coordinates by the GPS device at least at two points during flight, the position measuring device measures positions of the two points of the flying vehicle system from an installation point, wherein the position measuring device measures positions of the flying vehicle system at the two points from the installation points, and either one of the control units are configured so as to obtain an absolute coordinate or GPS coordinate of the installation point of the position measuring device based on the GPS coordinates of the two points and based on distance measurement results and on angle measurement results by the position measuring device. As a result, it becomes possible to easily perform measurement at a place where absolute coordinates or GPS coordinates of the installation position of the position measuring device are not able to be obtained or are difficult to be obtained.

Further, according to the present invention, in the measuring system, the control unit controls the flight of the flying vehicle system based on the absolute coordinates or on the GPS coordinates. As a result, in a case where it is not possible to perform positional measurement by the GPS device, a remote control of the flying vehicle system is possible to be performed based on the measurement result of the position measuring device, and in a case where it is not possible to perform positional measurement by the position measuring device, a remote control of the flying vehicle system is possible to be performed based on the results of positional measurement of the GPS device, and there is no restriction caused by a measuring environment.

Further, according to the present invention, in the measuring system, the measuring device is a shape measuring device for measuring a shape of an object to be measured, and the control unit obtains coordinates of the shape of the object to be measured based on a shape of an object to be measured obtained by the shape measuring device at a measuring position and based on absolute coordinates of the measuring position obtained by converting measurement results of the position measuring device or on GPS coordinates obtained by the GPS device. As a result, it is possible to determine the shape of the object to be measured, which is in complicated shape or is in large size.

Further, according to the present invention, in the measuring system, the measuring device is a camera, and the control unit performs photogrammetry on an object to be measured based on an image of the object to be measured acquired by the camera at least at two points during flight, and based on absolute coordinates or GPS coordinates of the two points obtained by converting measurement results of the position measuring device or based on absolute coordinates or GPS coordinates of the two points obtained by the GPS device. As a result, even at a place where the GPS device is not capable of performing positional measurement, it is possible to carry out photogrammetry by using the flying vehicle system.

Furthermore, according to the present invention, in the measuring system, the position measuring device is installed at two or more arbitrary points, the control unit obtains absolute coordinates or GPS coordinates of each of the installation points of the position measuring device, performs measurement by the position measuring device from each of the installation points, converts the obtained measurement results to absolute coordinates or GPS coordinates respectively and integrates the measurement results obtained by the measurement from each of the installation points. As a result, it becomes possible to easily perform measurements at a land with complicated shape or to perform measurements on the object to be measured with complicated shape.

DETAILED DESCRIPTION OF THE PREFERRED EMBODIMENT

Description will be given below on an embodiment of the present invention by referring to the attached drawings.

Figure 1:
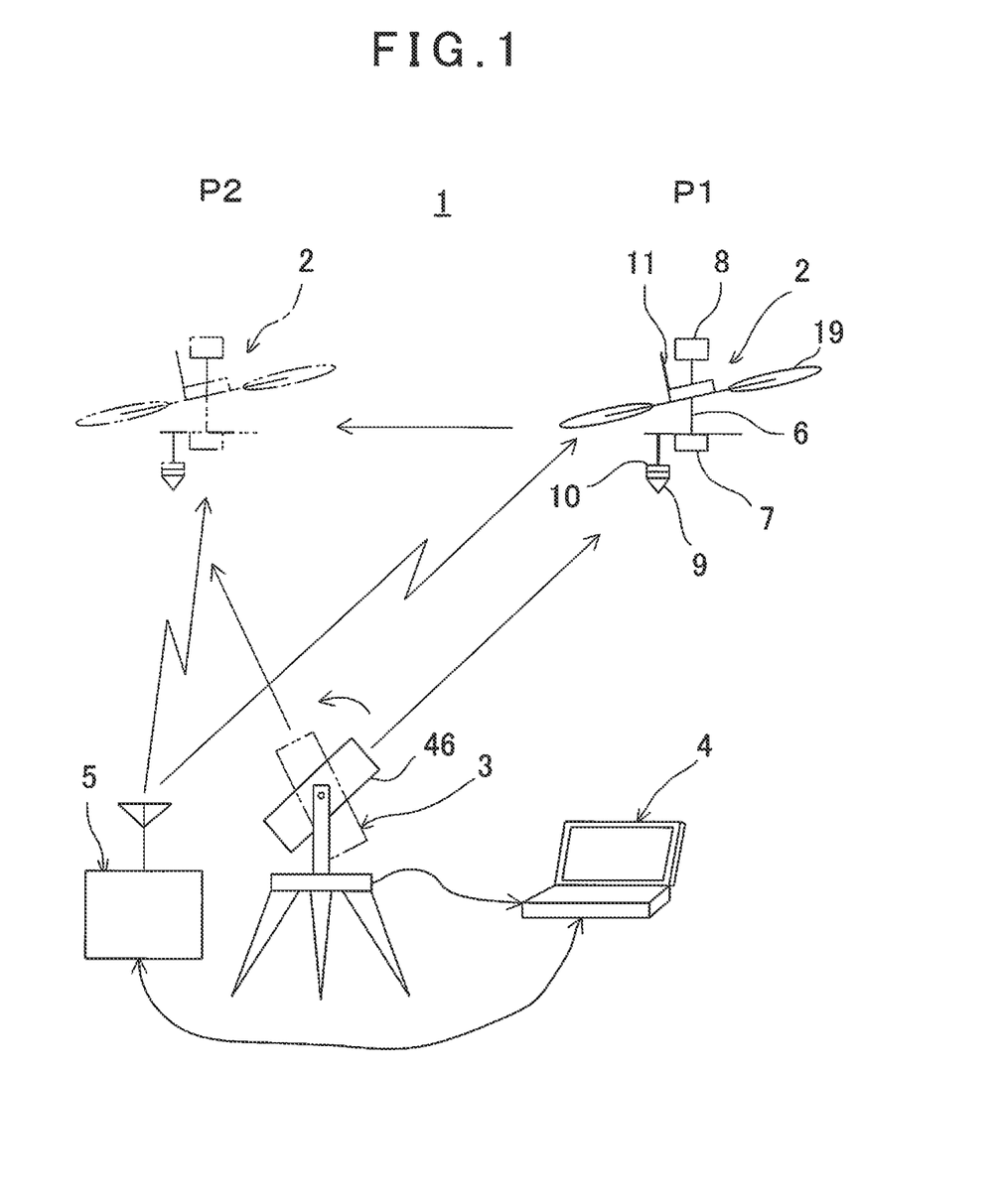
FIG. 1 is a diagrammatic sketch to show an arrangement of a measuring system according to the present embodiment.

First, referring to FIG. 1, a description will be given on a measuring system according to the present embodiment.

A measuring system 1 primarily comprises one each of a flying vehicle system (UAV) 2, a position measuring device 3, a ground base station 4 and a remote controller 5. FIG. 1 shows a case where a total station (TS) is used as the position measuring device 3.

The flying vehicle system 2 primarily comprises a flying vehicle 15 (to be described later), a shaft 6 as a supporting member vertically supported on the flying vehicle 15 via a gimbal mechanism, a camera 7 disposed at a lower end of the shaft 6 and used as a photographing device, a GPS device 8 disposed at an upper end of the shaft 6, a prism 9 as a retro-reflector and disposed at a lower end of the shaft 6, a direction angle sensor 10 integrally mounted with the prism 9 and disposed in a known relation with an optical axis of the camera 7, and a flying vehicle communication unit 11 to communicate to and from the ground base station 4.

Here, a reference position is set for the flying vehicle system 2 and the relation between the reference position and each of the camera 7, the GPS device 8 and the prism 9 is already known. It is to be noted that as the reference position of the flying vehicle system 2, for instance, a central position or the like of an image element (not shown) of the camera 7 is used.

It is so arranged that the camera 7 is rotatably supported around the center via a horizontal shaft so that optical axis of the camera 7 is rotatable within a plane, which is parallel to a center line of the shaft 6. Further, a rotation range of the camera 7 include at least a range from vertical position to horizontal position with respect to the optical axis of the camera 7.

Since the shaft 6 is supported by the gimbal mechanism so that the center line of the shaft 6 is in vertical direction, in a case where the optical axis of the camera 7 is in vertical direction, the optical axis of the camera 7 coincides with the center line of the shaft 6.

An optical axis of the prism 9 is also arranged so as to run in parallel with the center line of the shaft 6, and the optical axis of the prism 9 is set so as to run in vertical direction. Further, the positional relation between the prism 9 and the camera 7 is also already known. It is to be noted that it would suffice if the camera 7 and the optical axis of the camera 7 and of the prism 9 run in vertical direction, and the center line of the shaft 6 may not necessarily run in vertical direction.

The prism 9 is installed so that the prism 9 faces in downward direction and has an optical characteristic to retro-reflect light entering from the entire ranges below the prism 9. Further, instead of the prism 9, a reflection seal may be provided at a predetermined position of the shaft 6.

A position to be measured by the GPS device 8 is located on the center line of the shaft 6, and the position to be measured by the GPS device 8 is already known with respect to the camera 7.

The direction angle sensor 10 detects a direction of the flying vehicle system 2. As the direction angle sensor 10, the following is known, for instance.

Figure 2A:
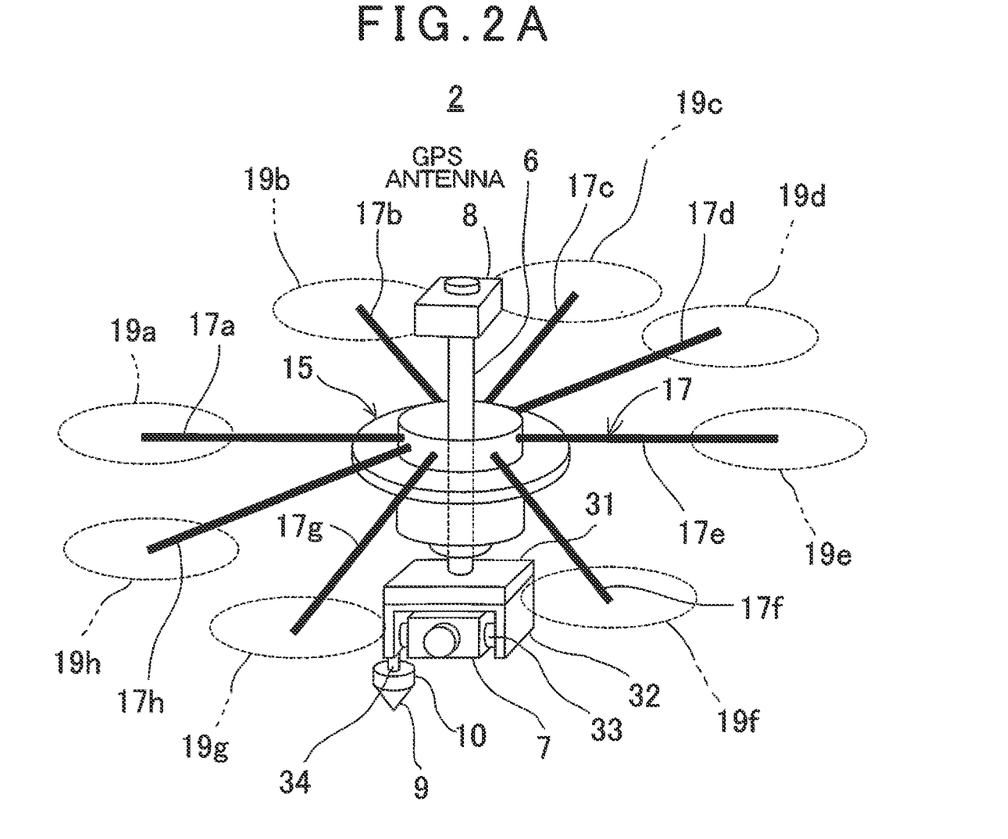
FIG. 2A is a perspective view of a flying vehicle system according to the present embodiment and FIG. 2B is a perspective view to show one example of a direction angle sensor.
Figure 2B:
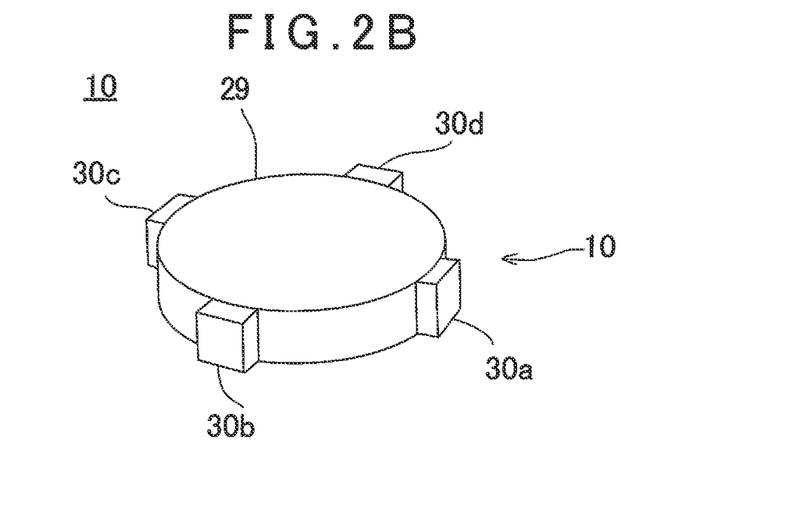

On a circumference and at positions equally divided as required on the circumference, photodetection sensors 30 are provided. Each of the photodetection sensors 30 is capable of receiving a distance measuring light or a tracking light emitted from the position measuring device 3. By judging as to which of the photodetection sensors 30 has received and detected the distance measuring light or the tracking light, a direction with respect to the distance measuring light or the tracking light (i.e. a direction with respect to the position measuring device 3) can be detected.

The position measuring device 3 is installed at an arbitrary position, and leveling is performed so that the position measuring device 3 is to be in horizontal position. The position measuring device 3 is capable of distance measurement by non-prism measurement (i.e. measurement using neither prism nor retro-reflector) and by prism measurement (i.e. measurement using prism or retro-reflector as a target of measurement), and also capable of measuring horizontal angle and vertical angle.

Non-prism measurement is capable of performing non-prism measurement on a pre-scheduled range with reference to the installation position of the position measuring device 3.

Further, the position measuring device 3 has tracking function. Under the condition where prism measurement is being performed, the position measuring device 3 measures three-dimensional coordinates (slope distance, horizontal angle and vertical angle), with reference to the installation position of the position measuring device 3 of the prism 9 while tracking the prism 9 during the flight of the flying vehicle system 2. It is to be noted that a total station (TS) is used as the position measuring device 3, but it is not limited to the TS as long as the position measuring device 3 has a tracking function and is capable of measuring slope distance, horizontal angle and vertical angle.

The position measuring device 3 is electrically connected to the ground base station 4 via wired or wireless means, and three-dimensional coordinates thus measured are inputted to the ground base station 4 as coordinate data.

The installation position (absolute coordinates) of the position measuring device 3 can be measured by a method as given below.

A position of the flying vehicle system 2 during the flight is measured by the position measuring device 3, and further, positional coordinates at two points of the flying vehicle system 2 are measured by the GPS device 8. Based on the measurement results acquired by the position measuring device 3 and on positional coordinates (GPS coordinates) acquired by the GPS device 8, an installation position (GPS coordinates) of the position measuring device 3 is measured by a method of resection. Further, absolute coordinates can be obtained by coordinate conversion of the GPS coordinates. Therefore, if the GPS coordinates are obtained, it becomes possible to obtain absolute coordinates of the position measuring device 3, it becomes possible to convert three-dimensional coordinates measured by the position measuring device 3 to absolute coordinates, and it becomes possible to convert the results of the non-prism measurement to absolute coordinates with reference to the installation position of the position measuring device 3.

Furthermore, the prism 9 (i.e. the flying vehicle system 2) is tracked and measured by the position measuring device 3, three-dimensional coordinates of the prism 9 thus obtained (i.e. three-dimensional coordinates of the flying vehicle system 2) (TS coordinates) can also be converted to GPS coordinates, and further, to absolute coordinates, in a similar manner. Therefore, by transmitting the positional coordinates of the flying vehicle system 2 as measured by the position measuring device 2 in real time from the ground base station 4 to the flying vehicle system 2, it is possible to make the flying vehicle system 2 fly based on the positional coordinates measured by the position measuring device 3. It is to be noted that in the description as given below, the measurement results of the position measuring device 3 as converted to GPS coordinates are also called as GPS coordinates.

The ground base station 4 is a PC, for instance, and has an arithmetic operation device having a calculating function, a storage unit for storing data and program, and further, a base communication unit. The base communication unit is capable of communicating to and from the position measuring device 3 and the remote controller 5, and the remote controller 5 is capable of performing wireless communication to and from the flying vehicle communication unit 11. Further, based on the results of non-prism measurement, the ground base station 4 sets up a flight safety range and transmits control data relating to the flying range to the remote controller 5 so that the flying vehicle system 2 is adapted to be remotely controlled within the flight safety range.

The remote controller 5 is for remotely controlling the flight of the flying vehicle system 2. In a case where a flight range restricting data relating to the flight range are transmitted from the ground base station 4, a flight control signal transmitted from the remote controller 5 is subject to restriction of the flight range restricting data, and the flying vehicle system 2 is controlled so as to fly within the flight safety range. Further, the camera 7 and a shutter of the camera 7 are designed as remotely controllable.

The flying vehicle system 2 has a control unit as described below, so by setting the flight plan data to the control unit, the flying vehicle system 2 is capable of autonomous flight based on positional data from the position measuring device 3 and on positional data as measured by the GPS device 8.

Figure 3:
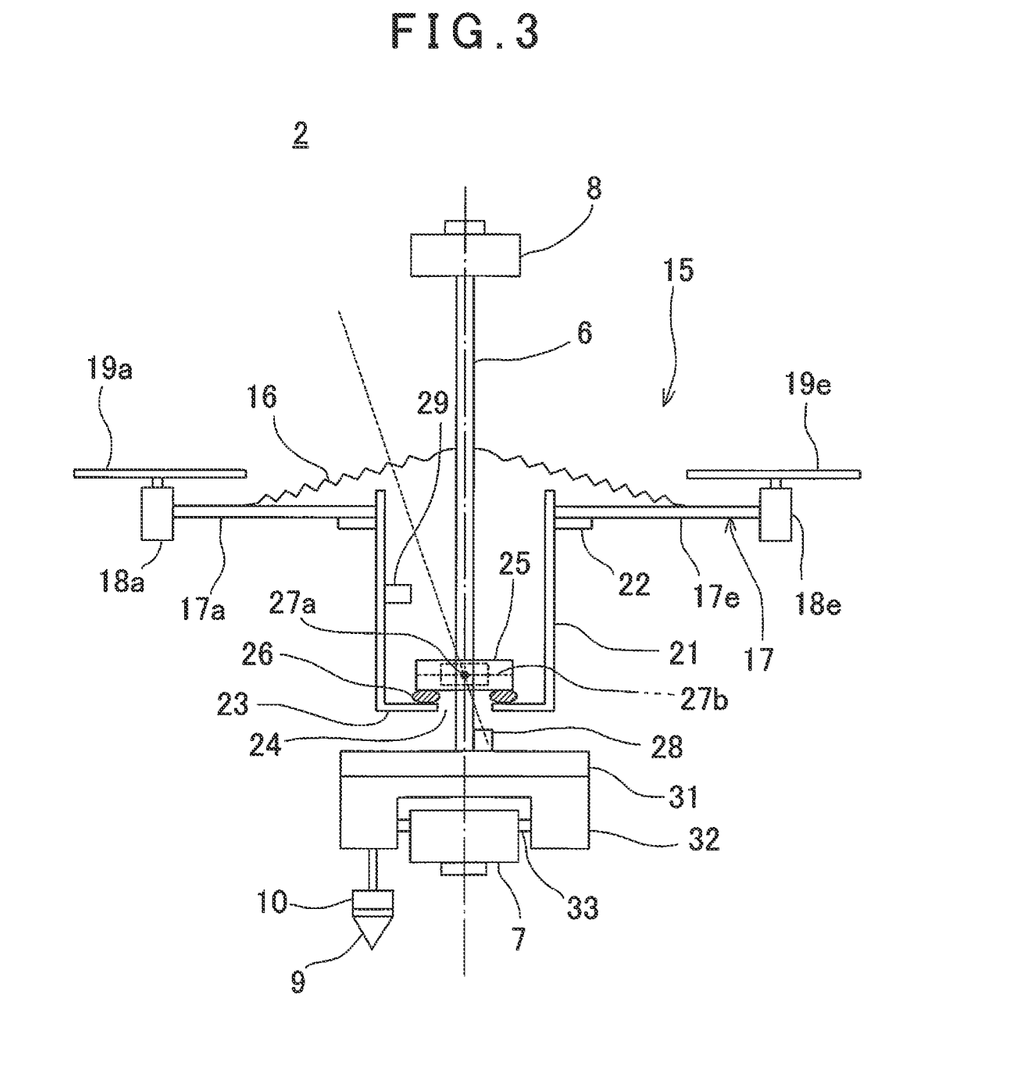
FIG. 3 is a cross-sectional view of the flying vehicle system.

Next, referring to FIG. 2A, FIG. 2B, and FIG. 3, description will be given on the flying vehicle system 2.

The flying vehicle 15 has a plurality of and even numbers of propeller frames 17 extending in radial direction, and a propeller unit is mounted on a forward end of each of the propeller frames 17. The propeller unit comprises a propeller motor 18 disposed at a forward end of the propeller frame 17, and propellers 19 (19*a* to 19*h* in the figure) are mounted on an output shaft of the propeller motor 18. The propellers 19 are rotated by the propeller motor 18 and the flying vehicle 15 is capable of flying.

The flying vehicle 15 has a main frame 21 in hollow and cylindrical shape at its center. An outer flange 22 extending in an outward direction is provided on an upper end of the main frame 21, and an inner flange 23 extending toward the center is provided on a lower end of the main frame 21. At the central portion of the inner flange 23, a circular hole 24 is formed.

The propeller frame 17 is designed in form of a rod. The propeller frame is disposed within a plane, which perpendicularly cross the center line of the main frame 21, and a predetermined number of propeller frames (at least 4 propeller frames, or preferably 8 propeller frames; in the figure, 8 propeller frames (17a to 17h) are shown) are provided in a horizontal direction with an equal angular interval. Internal end portion of the propeller frame 17 penetrates the main frame 21 and is fixed on the outer flange 22.

The shaft 6 is provided so as to penetrate the main frame 21 in up-and-down direction, the shaft 6 is supported by a gimbal 25 so as to run in vertical direction, and the gimbal 25 is mounted on the inner flange 23 via a vibration-proof member 26.

The gimbal 25 has swing shafts 27a and 27b, which perpendicularly cross in two directions, and the gimbal 25 movably supports the shaft 6 in two directions perpendicularly crossing each other. The vibration-proof member 26 absorbs a vibration caused by rotation of the propeller motor 18 and the propeller 19, and the vibration-proof member 26 is designed so that the vibration is not transferred to the shaft 6.

A tilt sensor 28 is provided on a lower end of the shaft 6, and detects tilting of the shaft 6 caused by the change of the flying condition of the flying vehicle 15. Further, the tilt sensor 28 detects an angle between the vertical line and the center line of the shaft 6 when the shaft 6 is tilted with respect to the vertical line, and a detection result of the tilt sensor 28 is transmitted to the control unit 35 (see FIG. 4) which is to be described later.

The direction angle sensor 10 is provided at a position as required on the main frame 21. The direction angle sensor 10 detects a direction of the flying vehicle 15. The direction of the flying vehicle 15 is, for instance, the direction of the flying vehicle with reference to a direction facing a position where the position measuring device 3 is installed. Further, in the present embodiment, a direction angle sensor as shown in FIG. 2B is used as the direction angle sensor 10. It is to be noted that a magnetic compass may be used as the direction angle sensor 10.

The present embodiment shows a case where the direction angle sensor 10 is provided integrally with the prism 9. Describing briefly by referring to FIG. 2B, photodetection sensors 30a, 30b, 30c and 30d are provided along an outer peripheral surface of a sensor case 29 formed into a cylindrical shape. The photodetection sensors 30a, 30b, 30c and 30d are disposed at positions as determined by dividing the circumference in four equal parts, and are arranged so that photodetection signals are emitted when each of the photodetection sensors 30a, 30b, 30c and 30d receive a distance measuring light or a tracking light emitted from the position measuring device 3. Further, by judging as to at which position the photodetection sensors 30a, 30b, 30c and 30d have received the distance measuring light or the tracking light, the direction of the flying vehicle system 2 with respect to the position measuring device 3 is detected.

A control box 31 is provided on a lower end of the shaft 6. Inside the control box 31, the control unit 35 is accommodated. A camera holder 32 is disposed on the lower surface of the control box 31, and the camera 7 is provided on the camera holder 32 via a horizontal axis 33. The camera 7 is rotatable around the horizontal shaft 33 as the center and an image pickup direction changing motor (not shown) for rotating the camera 7 is installed via the horizontal shaft 33. A reference posture of the camera 7 is maintained with an optical axis in vertical direction, and the image pickup direction changing motor rotates the camera 7 at an angle as required with respect to the vertical direction according to an instruction from the control unit 35. In FIG. 2A, the optical axis of the camera 7 is in horizontal direction to facilitate the explanation.

On the lower surface of the camera holder 32, the direction angle sensor 10 is provided via a supporting member 34. Further, on the lower surface of the direction angle sensor 10, the prism 9 is provided integrally with the direction angle sensor 10.

On the upper end of the shaft 6, the GPS device 8 is disposed. The center of the GPS device 8 (reference position of the GPS device 8) coincides with the center line of the shaft 6, and the optical axis of the prism 9 is parallel to the center line of the shaft 6.

The control box 31, the camera holder 32, the camera 7, the prism 9, etc. fulfill functions as a balance weight. Under the condition where external force is not applied on the shaft 6, i.e. under a free condition, a weight balance of the control box 31, the camera holder 32, the camera 7 and the prism 9 is set so that the shaft 6 is maintained in vertical condition.

In a case where the shaft 6 is enabled to sufficiently maintain in a vertical position by the balance weight function of the control box 31, the camera holder 32, the camera 7, the prism 9, etc., a balance assisting member may not be provided. However, the balance assisting member may be provided in order to maintain the shaft 6 in vertical condition and may be provided so that the shaft 6 can be promptly restored to a vertical condition in a case where the shaft 6 is suddenly tilted (in a case where the posture of the flying vehicle 15 rapidly changes).

In the example as given below, description will be given on a case where a damper spring 16 is provided as the balance assisting member.

Between the propeller frame 17 and the shaft 6, the damper spring 16 is stretched over. At least three damper springs 16, or more preferably, four damper springs 16 are provided, and it is preferable that the damper spring 16 are mounted between each of the propeller frames 17 extending in parallel to the swing shafts 27a and 27b and the shaft 6.

Further, each of the four damper springs 16 applies tensile force between the shaft 6 and the propeller frame 17 respectively so that the shaft 6 can maintain the vertical condition by the balancing of the tensile forces when the flying vehicle 15 takes horizontal posture (i.e. a condition where the propeller frames 17 are in horizontal condition). Further, the tensile force and a spring constant of the damper spring 16 is set to a smaller value so that the shaft 6 is directed in vertical direction due to the gravitational force when the flying vehicle 15 is tilted.

The damper spring 16 is a biasing means to apply biasing force on the shaft 6 to be maintained in vertical condition. In a case where the shaft 6 is moved or vibrated, the damper spring 16 promptly restores the shaft 6 to a vertical condition and makes the vibration attenuated. Further, as the biasing means, a torsion coil spring for rotating in a returning direction may be used to rotate the swing shafts 27a and 27b when the swing shafts 27a and 27b of the gimbal 25 are rotated in addition to the damper spring 16 as described above.

Figure 4:
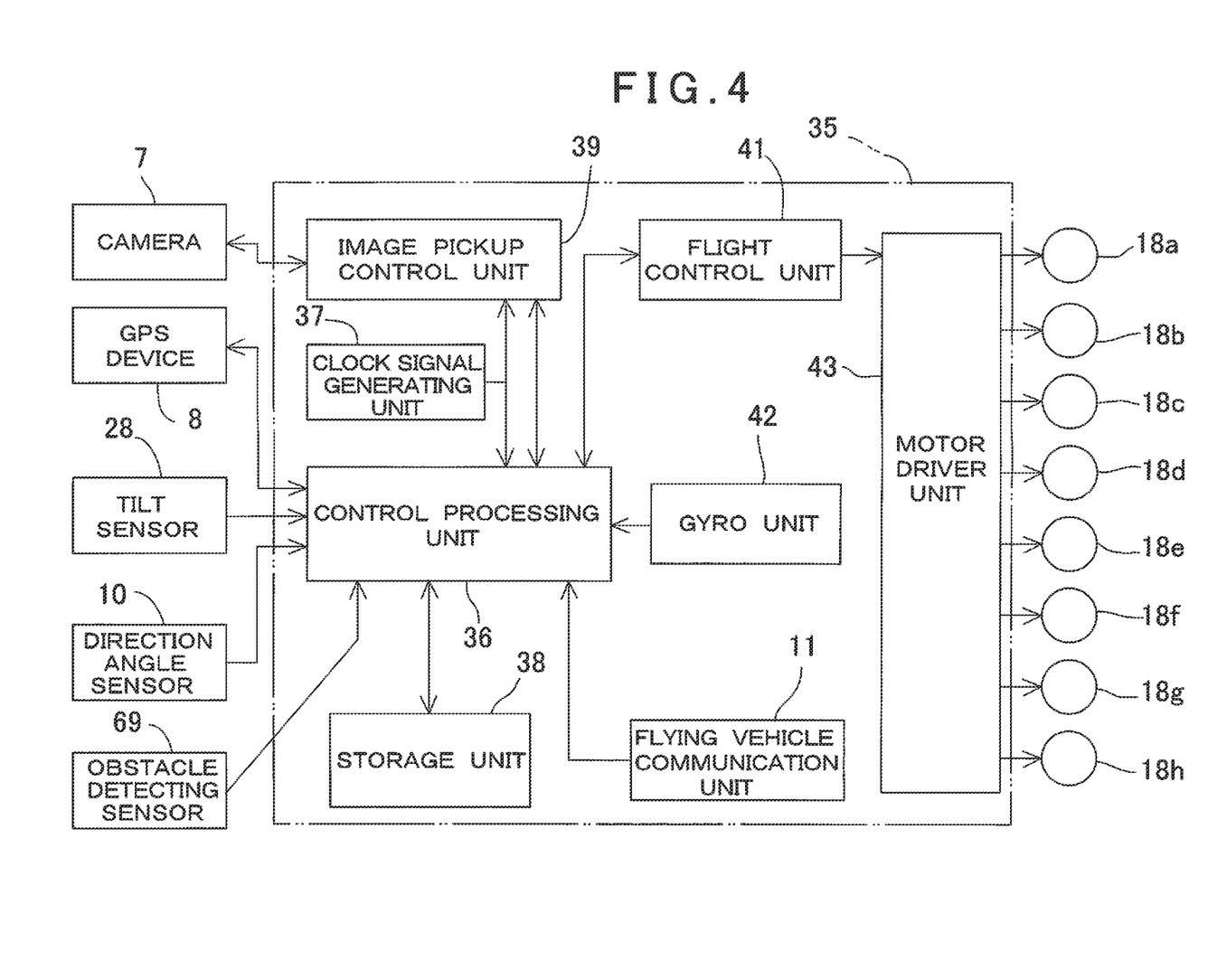
FIG. 4 is a block diagram to show an arrangement of a control system of the flying vehicle system.

Referring to FIG. 4, description will be given below on control system of the flying vehicle system 2.

The control unit 35 is accommodated inside the control box 31.

The control unit 35 primarily comprises a control processing unit 36, a clock signal generating unit 37, a storage unit 38, an image pickup control unit 39, a flight control unit 41, a gyro unit 42, a motor driver unit 43, and the flying vehicle communication unit 11.

Photographing by the camera 7 is controlled by the image pickup control unit 39, and the image taken by the camera 7 is inputted to the image pickup control unit 39 as image data.

A digital camera is used as the camera 7, and still images can be taken, and video images can also be taken. Further, as an image pickup element, a CCD, a CMOS sensor, etc., each being an aggregate of pixels, is used, and it is so arranged that a position of each of the pixels in the image pickup element is able to be specified. For instance, the position of each pixel is able to be specified by orthogonal coordinates, which have the point where the optical axis of the camera of the image pickup element passes through as an origin point. The still images are used in photogrammetry and a video tracking is carried out by using the video images.

As described above, the optical axis of the camera 7 coincides with the center line of the shaft 6, and the optical axis of the prism 9 runs in parallel to the center line of the shaft 6. Further, the optical axis of the prism 9 is in a positional relation already known with the optical axis of the camera 7.

In the storage unit 38, a program storage area and a data storage area are formed. In the program storage area, the following programs are stored: a photographing program for controlling photographing operation of the camera 7, a flight control program for driving and controlling the propeller motor 18, a communication program for transmitting the acquired data to the ground base station 4 and for receiving a flight command and the like from the remote controller 5, a data processing program for processing and storing the data obtained by the camera 7, an image tracking program for performing the tracking by using video images, and other programs.

In the data storage area, various types of data are stored. These data include: a flight plan data for executing autonomous flight, a still image data and a video image data acquired by the camera 7, a positional data of the flying vehicle system 2 as measured during flight, a positional data of the flying vehicle system 2 as measured by the position measuring device 3 and as transmitted from the remote controller 5, and further, a time and a positional data of when the still image data and the video image data are acquired, and the like.

Based on the control signals issued from the control processing unit 36, the image pickup control unit 39 carries out controlling with respect to the photographing operation of the camera 7. The modes of the control include: selecting of the camera angle depending on the object to be measured, controlling of the image pickup by the camera 7, and controlling to acquire still images at a predetermined time interval while acquiring video images, and the like. For the camera 7, an image pickup moment is controlled or synchronously controlled according to clock signals issued from the clock signal generating unit 37.

The direction angle sensor 10 detects the direction of the flying vehicle 15 and inputs a detection result to the control processing unit 36. The gyro unit 42 detects a posture of the flying vehicle 15 under flight condition and inputs a detection result to the control processing unit 36.

When the flight of the flying vehicle 15 is remotely controlled by the remote controller 5, the flying vehicle communication unit 11 receives a maneuvering signal from the remote controller 5 and inputs the maneuvering signal to the control processing unit 36. Or, the flying vehicle communication unit 11 has a function such as transmitting the image data photographed by the camera 7 to the ground base station 4 on the ground side together with the photographing time.

The control processing unit 36 converts position coordinates (TS coordinates) as measured by the position measuring device 3 to GPS coordinates, acquires GPS coordinates of the flying vehicle system 2, and acquires GPS coordinates of the flying vehicle system 2 as measured by the GPS device 8. The control processing unit 36 calculates a flight control signal based on GPS coordinates as acquired and a flight command as transmitted from the remote controller 5 or calculates a flight control signal based on a flight plan data stored in the storage unit 38 and on the GPS coordinates and outputs the flight control signal to the flight control unit 41.

With regard to using which of GPS coordinates obtained based on the result of measurement by the position measuring device 3 or GPS coordinates measured by the GPS device 8, GPS coordinates as enabled to obtain is used as a rule. For instance, in a case where an obstacle exists between the flying vehicle system 2 and the position measuring device 3 and the flying vehicle system 2 cannot be tracked by the position measuring device 3, the positional coordinates measured by the GPS device 8 is used because the positional data from the position measuring device 3 are lost. Further, under a condition such that radio waves from artificial satellite are interrupted by a building or the like, the GPS coordinates as obtained based on the measurement result of the position measuring device 3 are used. It is to be noted that absolute coordinates obtained from GPS coordinates may be used as positional information to make the flying vehicle system 2 fly.

In a case where both the measurement results from the position measuring device 3 and the measurement results by the GPS device 8 are obtained, priority to be used may be determined in advance. It is to be noted that since a measurement accuracy of the position measurement device 3 is higher, in a case where the priority is put on the accuracy, it is preferable to put priority on the measurement result by the position measurement device 3.

Further, the control processing unit 36 executes the control as necessary for image acquisition based on the program as required, which is stored in the storage unit 38.

When flight control signal is inputted from the control processing unit 36, the flight control unit 41 drives the propeller motor 18 to a condition as required via the motor driver unit 43 according to the flight control signal.

Figure 5:
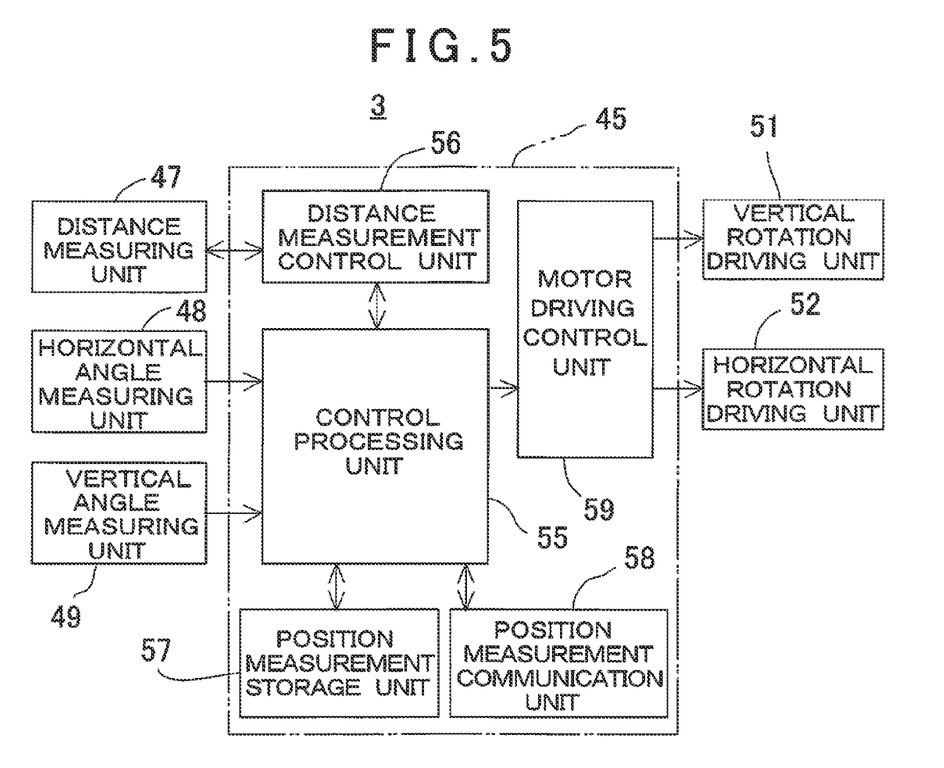
FIG. 5 is a schematical block diagram to show one example of a position measuring device according to the present embodiment.

Now, referring to FIG. 5, description will be given on the position measuring device 3.

The position measuring device 3 primarily comprises a position measurement control device 45, a telescope unit 46 (see FIG. 1), a distance measuring unit 47, a horizontal angle measuring unit 48, a vertical angle measuring unit 49, a vertical rotation driving unit 51, a horizontal rotation driving unit 52, etc.

The telescope unit 46 is used to collimate an object to be measured, the distance measuring unit 47 emits a distance measuring light via the telescope unit 46, further, receives a reflection light from the object to be measured via the telescope unit 46, and measures distance. Further, the distance measuring unit 47 has three modes as a measurement mode, i.e. a non-prism measurement mode, a prism measurement mode and a tracking measurement mode which tracks the object to be measured (prism) while carrying out prism measurement. It is possible to measure the distance to the object to be measured by one of these three modes. In the tracking measurement mode, a tracking light is projected via the telescope unit 46 in addition to the distance measuring light.

The horizontal angle measuring unit 48 detects a horizontal angle in the sighting direction of the telescope unit 46. Further, the vertical angle measuring unit 49 detects a vertical angle in the sighting direction of the telescope unit 46. The detection results of the horizontal angle measuring unit 48 and the vertical angle measuring unit 49 are inputted to the position measurement control unit 45.

The position measurement control unit 45 primarily comprises a control processing unit 55, a distance measurement control unit 56, a position measurement storage unit 57, a position measurement communication unit 58, a motor driving control unit 59, etc.

The following programs and the like are stored in the position measurement storage unit 57: a measurement program for performing distance measurement by each modes of the non-prism measurement mode, the prism measurement mode and the tracking measurement mode, a communication program for performing communication to and from the flying vehicle system 2 and the ground base station 4, and other programs. The measurement results of the object to be measured (distance measurement, angle measurement) are stored.

Based on the measurement mode selecting command from the control processing unit 55, the distance measurement control unit 56 determines as to which of the modes, the non-prism measurement mode, the prism measurement mode and the tracking measurement mode, should be adopted for the execution of the measurement, and controls the distance measurement control unit 56 according to the mode as determined. Here, in the non-prism measurement mode, the position measuring device 3 executes measurement on structures such as a building as the object to be measured. In the tracking measurement mode, the object to be measured becomes the prism 9 and the position measuring device 3 executes measurement on the position of the flying vehicle system 2 while tracking the flying vehicle system 2.

The motor driving control unit 59 controls the vertical rotation driving unit 51 and the horizontal rotation driving unit 52 and rotates the telescope unit 46 in vertical direction or in horizontal direction in order to sight the object to be measured by the telescope unit 46, or in order to track the object to be measured.

The position measurement communication unit 58 transmits the results (slope distance, vertical angle and horizontal angle of the prism 9), which is measured about the object to be measured (the prism 9) by tracking measurement mode, in real time, to the ground base station 4.

Figure 6:
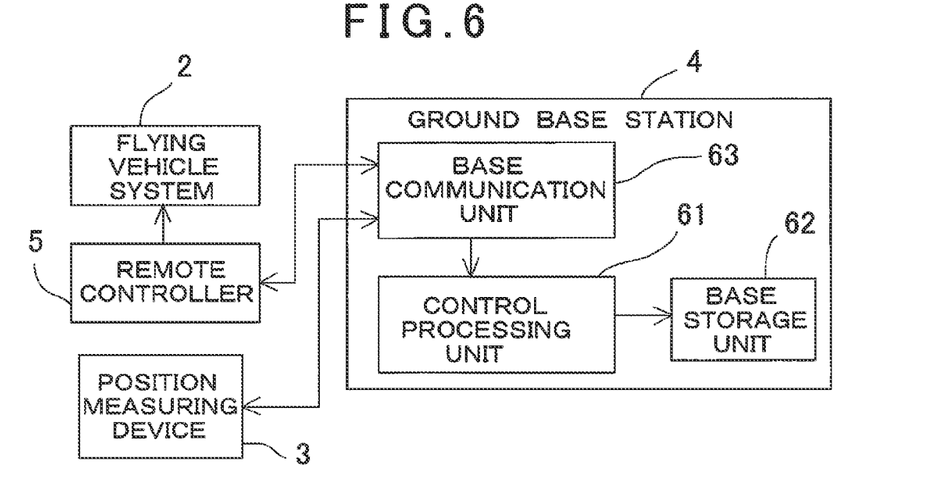
FIG. 6 is a block diagram to show an approximate arrangement of a ground base station and a relation between the flying vehicle system, the position measuring device, the ground base station and a remote controller.

FIG. 6 shows an approximate arrangement of the ground base station 4 and the relation of the flying vehicle system 2, the position measuring device 3, the ground base station 4, and the remote controller 5.

The ground base station 4 has a control processing unit 61 having a calculating function, a base storage unit 62, and further, a base communication unit 63.

The control processing unit 61 has the clock signal generating unit, associates an image data, a shutter time data and a coordinate data, as received via the remote controller 5, with a clock signal respectively, processes as time series data based on the clock signal, and stores in the base storage unit 62.

In the base storage unit 62, various programs are stored. These programs include: a flight plan preparing program for preparing a flight plan such as the setting up of a flight area based on map information obtained via the Internet or the like, a flight area calculating program for calculating the flight safety range of the flight vehicle system 2 according to the flight plan and a preliminary measurement data obtained by the position measuring unit 3, a flight control program for preparing flight control data based on the flight safety range and for controlling the flight of the flying vehicle system 2, a calculation program necessary for photogrammetry, a communication program for performing data communication to and from the remote controller 5 and the position measuring device 3, a program for calculating GPS coordinates of the installation position of the position measuring unit 3 based on GPS coordinates of the flying vehicle system 2 at two or more positions as transmitted from the flying vehicle system 2, a program for converting the measurement results (slope distance, vertical angle and horizontal angle) of the position measuring device 3 to GPS coordinates based on GPS coordinates of the installation position of the position measuring device 3, and other programs.

It is to be noted that as for the operation of converting measurement results of the position measuring device 3 to GPS coordinates based on GPS coordinates of the installation position of the position measuring device 3, it may be so arranged that the measurement results of the position measuring device 3 are transmitted to the flying vehicle system 2 without converting and the processing may be carried out by the control unit 35 of the flying vehicle system 2.

Further, various types of data such as the images acquired by the flying vehicle system 2, the measurement data as measured by the position measuring device 3 (coordinate data), the time when the image is acquired, positional coordinates, etc. are stored in the base storage unit 62.

The base communication unit 63 performs wired communication or wireless communication between the ground base station 4 and the remote controller 5.

A description will be given below on an operation of the present measuring system.

Figure 7:
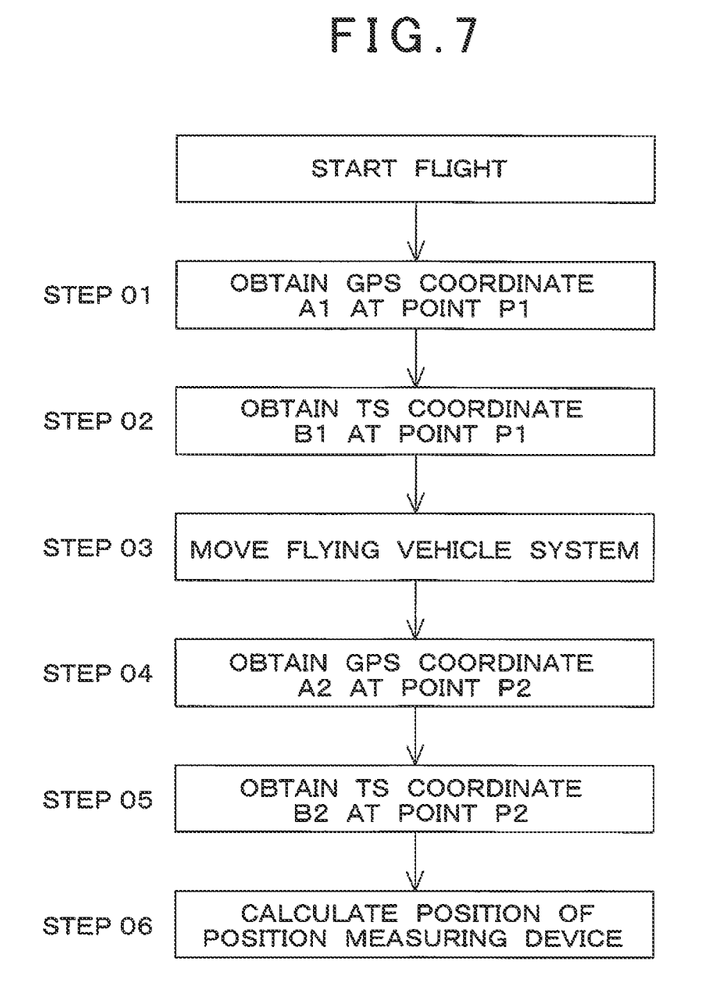
FIG. 7 is a flowchart to show the measurement of installation position by the position measuring device in the present embodiment.

First, referring to FIG. 7, a description will be given on an operation for acquiring positions (GPS coordinates or absolute coordinates) of the position measuring device 3 as set up at an arbitrary position.

The flying vehicle system 2 is operated by manual operation for flight by the remote controller 5. In a case where the flight plan is set up in advance, the flying vehicle system 2 may be operated for flight by automatic operation based on the flight plan. At the same time as the starting of the flight of the flying vehicle system 2, tracking by the position measuring device 3 is carried out.

(Step 01) A position as required during the flight of the flying vehicle system 2 is set as a point P1 and GPS coordinate A1 of the point P1 is acquired by the GPS device 8. The GPS coordinate A1 thus acquired is transmitted to the ground base station 4 via the remote controller 5.

(Step 02) A position (i.e. reference position of the flying vehicle system 2 is to be regarded as the position of the flying vehicle system 2) of the prism 9, when the flying vehicle system 2 is at a position of the point P1, is measured by the position measuring device 3, and a TS coordinate B1 of the point P1 is acquired by the position measuring device 3. It is to be noted that a coordinate acquiring timing is synchronously controlled by the ground base station 4 so that the acquisition of coordinates by the GPS device 8 and the acquisition of coordinates by the position measuring device 3 become the same time.

The TS coordinates B1 as acquired by the position measuring device 3 are transmitted to the ground base station 4. The GPS coordinates A1 as acquired by the GPS device and the TS coordinates B1 as acquired by the position measuring device 3 are associated with the time as acquired respectively and are stored at the base storage unit 62.

(Step 03) The flying vehicle system 2 is moved to a point P2 at another position as required. Here, the moving distance is calculated based on the coordinates of the point P1 and the point P2, and the length of the moving distance is determined by taking the flying height of the flying vehicle system 2 and the accuracy needed for the measurement into consideration.

(Step 04) GPS coordinates A2 of the point P2 are acquired by the GPS device 8. The GPS coordinates A2 thus acquired are transmitted to the ground base station 4 via the remote controller 5.

(Step 05) The position measuring device 3 measures a position of the flying vehicle system 2 when the flying vehicle system 2 is positioned at the point P2 and obtained TS coordinates B2 of the point P2. It is needless to say that synchronous control is performed for the acquisition of the GPS coordinates A2 and the acquisition of the TS coordinates B2.

(Step 06) A position of the point P1 relative to the installation position of the position measuring device 3 and a position of the point P2 relative to the installation position of the position measuring device 3 are measured as the TS coordinates B1 and TS coordinates B2, and since GPS coordinates of the point P1 and the point P2 are measured as the GPS coordinates A1 and the GPS coordinates A2, the GPS coordinate of the installation position of the position measuring device 3 is calculated by the method of resection.

Because the GPS coordinate of the installation position of the position measuring device 3 is obtained, it is possible to convert TS coordinates of the flying vehicle system 2 measured by the position measuring device 3 to GPS coordinates. Therefore, similarly to the positional information as obtained by the GPS device 8, it is possible to control the flight of the flying vehicle system 2 based on the positional information of the flying vehicle system 2 measured by the position measuring device 3.

As described above, a positional information of the flying vehicle system 2 can be obtained by the GPS device 8 or by the position measuring device 3.

Figure 8:
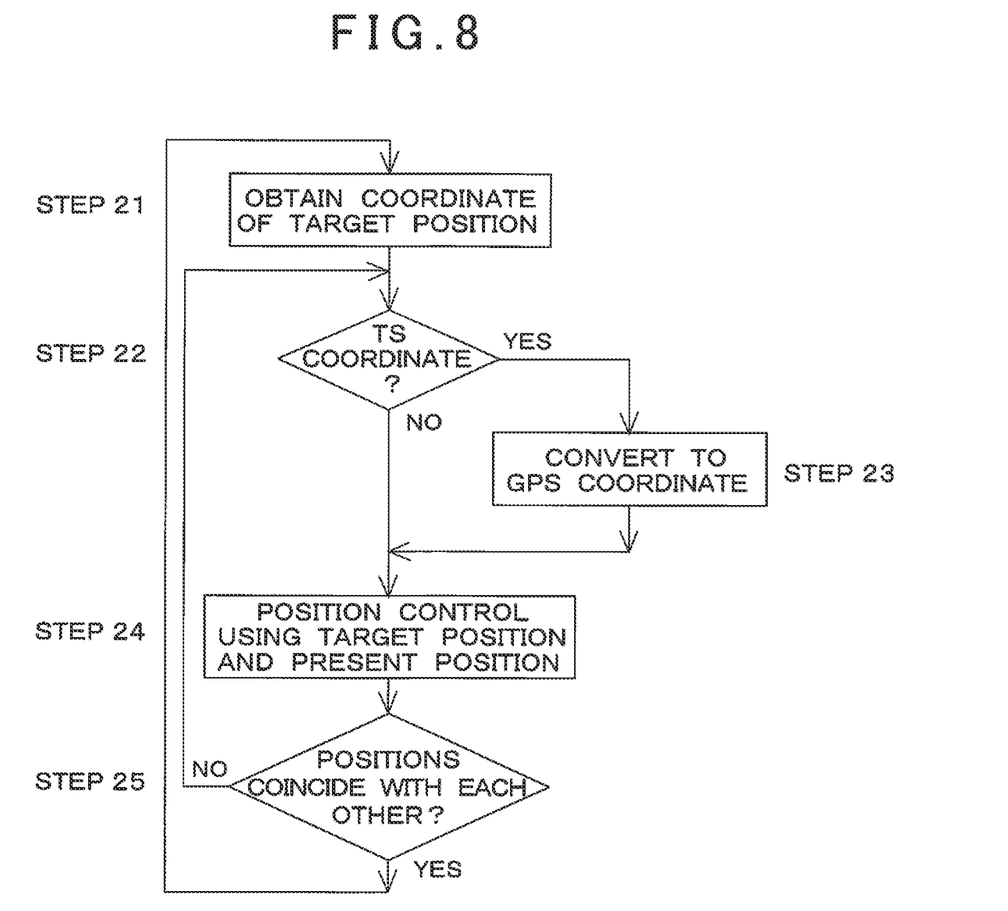
FIG. 8 is a flowchart to show guidance of the flying vehicle system in the present embodiment.

Referring to FIG. 4 and FIG. 8, a description will be given on a guiding operation of the flying vehicle system 2.

As described above, since the installation position (GPS coordinates) of the position measuring device 3 as arbitrarily set up is obtained, it is possible to carry out remote control of the flying vehicle system 2 based on position measurement of the flying vehicle system 2 by the position measuring device 3.

In a case where the measurement is performed by the flying vehicle system 2, it is possible to operate the flying vehicle system 2 by remote control based on visual inspection, and photographing can be performed adequately by the judgment of an operator of measurement.

Further, a flight plan or a measurement plan may be set up at the flying vehicle system 2 and the ground base station 4 in advance and a measurement may be carried out based on the flight plan or the measurement plan.

The description as given below is the case where a flight plan is set up and the case where the flight plan is set up on the flying vehicle system 2.

(Step 21) The control processing unit 36 reads a target position coordinate (target position) from the flight plan as stored in the storage unit 38 and an information of the present position of the flying vehicle system 2 is acquired.

(Step 22) Judgment is made by the control processing unit 36 as to whether the positional information acquired is GPS coordinates or TS coordinates. In a case where both the GPS coordinates and the TS coordinates can be acquired, an order of priority should be set up in advance. For instance, it is set that priority is given on positional information from the GPS device 8.

(Step 23) In a case where there is no positional information from the GPS device 8 and a positional information from the position measuring device 3 can be acquired, the control processing unit 36 converts TS coordinates to GPS coordinates. In a case where a positional information from the GPS device 8 can be acquired, the GPS coordinates are obtained directly as the present positional information.

(Step 24) The control processing unit 36 compares the target position with the present position, obtains a deviation and issues a control signal to the flight control unit 41 so that the deviation will be 0. The flight control unit 41 controls the driving of the propeller motor 18 via the motor driver unit 43 based on the control signal.

(Step 25) In a case where the target position and the present position coincide with each other, i.e. a case where the deviation is 0 or in an admissible range, the operation as required such as photographing by the camera 7, and the like, is carried out. When the operation as required is completed, the next target position is read by the control processing unit 36, and the procedure of Step 21 to Step 25 is repeated.

Further, in a case where it is judged by the control processing unit 36 that the target position and the present position do not coincide with each other in Step 25, the procedure of Step 22 to Step 25 is further repeated.

Figure 9:
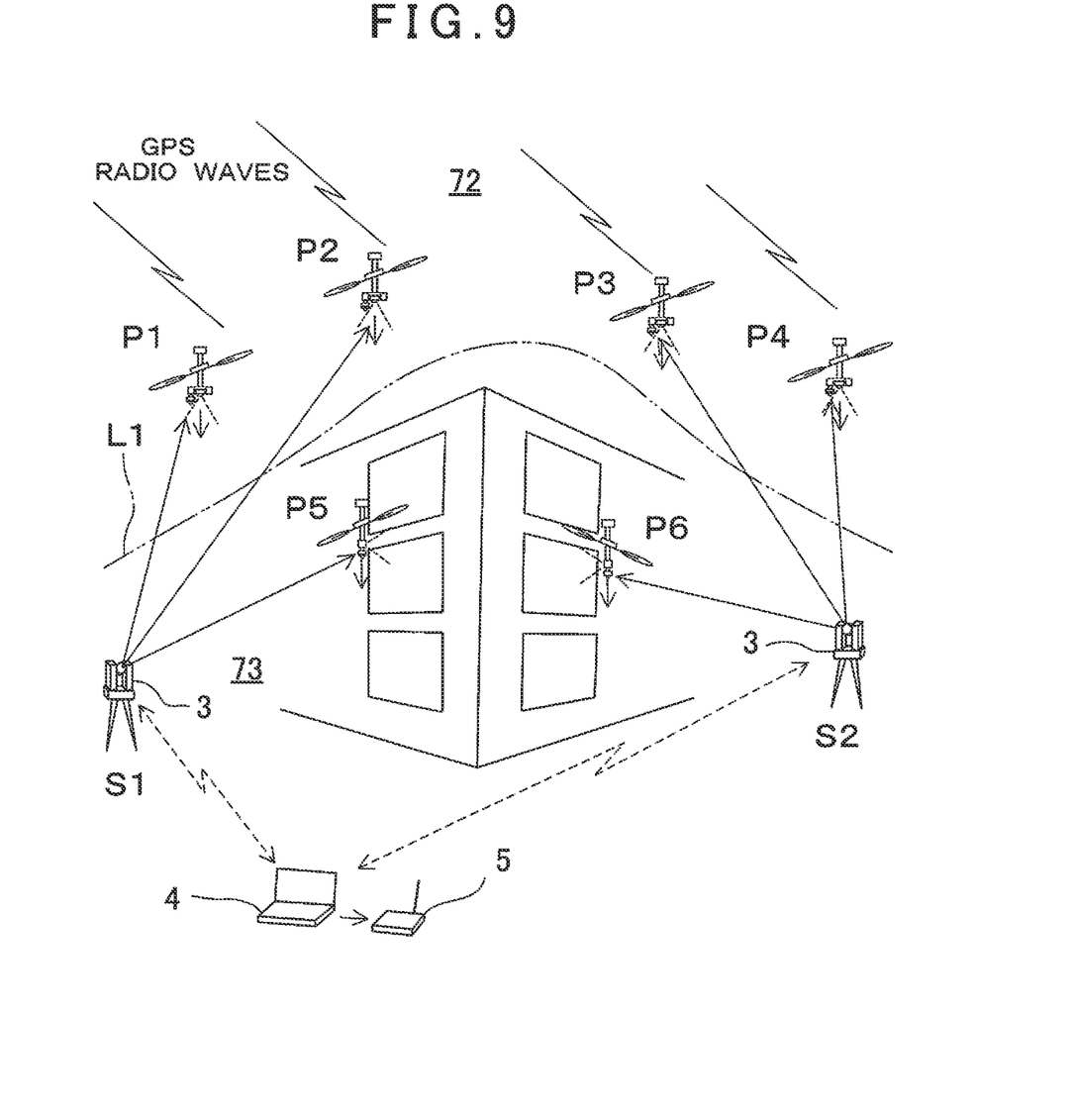
FIG. 9 is an explanatory diagram to show guidance of the flying vehicle system and the measurement by the flying vehicle system and the position measuring device in the present embodiment.

Referring to FIG. 9, a description will be given on the measurement using the guiding operation as given above. In the figure, a space above the line shown as L1 is a space where the GPS device 8 is capable of receiving radio waves of artificial satellite (a space 72 where the GPS device 8 is capable of acquiring a positional information), and a space below the line L1 shows a space 73 where the GPS device 8 is not capable of acquiring a positional information. Further, FIG. 9 shows a case where photogrammetry is primarily executed. In a case where the photogrammetry is executed, a direction of the camera 7 becomes necessary, so a signal obtained by the direction angle sensor 10 is used.

Further, in a case where the flying vehicle system 2 is operated to fly near an object to be measured (a building) or to fly in a space where an obstacle exists, a signal obtained by an obstacle detecting sensor 69 is used for keeping the safety of the flight. The obstacle detecting sensor 69 is an ultrasonic wave sensor, for instance, and detects a distance between the flying vehicle system 2 and an object to be measured or an obstacle. The control processing unit 36 controls the flight so that the distance from the obstacle does not become shorter than the predetermined distance based on the distance as detected.

In FIG. 9, points P1 to P6 show target positions as set up in the flight plan and points P1 to P4 are the points where the flying vehicle system 2 flies in the space 72 and where the GPS device 8 is capable of using. Further, points P5 and P6 are the points where the flying vehicle system 2 flies in the space 73 and where the GPS device 8 is not capable of using.

Further, FIG. 9 shows a condition where the position measuring device 3 is installed at an installation position S1 at first, and then, installed at an installation position S2. With respect to both the installation position S1 and the installation position S2, the procedures of Step 01 to Step 06 are executed as described above and GPS coordinates are obtained.

While the flying vehicle system 2 is flying in the space 72, position coordinates (GPS coordinates) can be obtained by the GPS device 8, and the flight of the flying vehicle system 2 is controlled based on the positional information obtained from the GPS device 8. The flying vehicle system 2 is guided to the points P1 to P4, photographs are taken at the points P1 to P4 respectively, and photogrammetry is carried out based on the acquired photographs and the positional information of points P1 to P4.

It is to be noted that in a case where positional information measured by the position measuring device 3 is acquired, the positional information measured by the position measuring device 3 is higher in accuracy, so by controlling the flight of the flying vehicle system 2 based on the positional information obtained by the position measuring device 3, the measurement accuracy improves.

In a case where the flying vehicle system 2 flies in the space 73, it is a condition where the GPS device 8 cannot be used.

For instance, a case where a photographing is carried out along a side wall of a building and radio waves from an artificial satellite are interrupted by the building.

In a case where the flying vehicle system 2 flies in the space 73, the flight of the flying vehicle system 2 is controlled based on the positional information measured by the position measuring device 3. Further, position coordinates of points P5 and P6 are measured by the flying vehicle system 2.

Further, there may be a case where a dead angle occurs under the condition where the position measuring device 3 is installed at one point, and it is not possible to measure the range of the dead angle by the position measuring device 3. In the present embodiment, the position measuring device 3 is capable of moving to an arbitrary position depending on the measurement condition. As described above, since it is possible to easily measure GPS coordinates of the installation position S2 after the moving, both the measurement data obtained at the installation position S1 and the measurement data obtained at the installation position S2 is capable of being converted as a GPS coordinate system, and further, as an absolute coordinate system, and it is possible to easily carry out the association of mutual data.

According to the measuring system in the present embodiment, it is possible to carry out measurements in various measurement modes.

[Measurement Mode 1]

In a case where photogrammetry is primarily carried out, the position measuring device 3 measures a position of the flying vehicle system 2 and fulfills the function as a positional information acquiring means in order to control the flight of the flying vehicle system 2.

In the measurement mode 1, in a case where the positional information can be acquired from the GPS device 8 and the position measuring device 3, positional information is acquired according to the order of priority as set up, and photographs for measurement are acquired at the position as set up in the flight plan.

Here, as a case where the position measuring device 3 is not capable of acquiring a positional information, for instance: a case where measurement is carried out on a roof of a building, or the like, i.e. a case where the flying vehicle system 2 is in the dead angle of the position measuring device 3. Further, as a case where the GPS device 8 is not capable of acquiring a positional information is a case where measurement is made on a wall surface of a building or under a bridge, or the like, i.e. a place, etc. where radio waves from the artificial satellite does not reach. It is to be noted that in a case where photographing is carried out on a wall surface of a building, or the like, it is needless to say that the camera 7 is rotated and controlled so that the optical axis is maintained in horizontal direction, or the like.

Further, auxiliarily, in a case where the measurement is carried out at a place where the flying vehicle system 2 is not capable of flying, at a place where the space is narrow or there is a roof or the like, an object to be measured is directly measured by the position measuring device 3.

[Measurement mode 2]

In a case where the measurement by the position measuring device 3 is primarily carried out, the flying vehicle system 2 is used as the means to measure GPS coordinates or absolute coordinates of the installation position of the position measuring device 3.

As described above, the position measuring device 3 is installed at an arbitrary position, the flying vehicle system 2 is made to fly, GPS coordinates at two points are obtained by the GPS device 8, and further, by measuring the flying vehicle system 2 at the two points by the position measuring device 3, it becomes possible to obtain GPS coordinates and absolute coordinates of the installation position of the position measuring device 3.

Therefore, by measuring the object to be measured by the position measuring device 3, it becomes possible to obtain GPS coordinates or absolute coordinates of the object to be measured. Further, the installation position of the position measuring device 3 can be changed as necessary wherever the object to be measured can be sighted. As a result, it becomes possible to obtain measurement results, which cannot be obtained when the position measuring device 3 is installed at one point such as on a rear side of a building, or the like.

Further, even in a case where the installation position of the position measuring device 3 is changed, GPS coordinates or absolute coordinates is capable of being measured. As a result, an association of all measurement data is capable of being easily carried out.

[Measurement Mode 3]

In a case where importance is placed upon the measurement accuracy, the measurement of the object to be measured is carried out by the position measuring device 3 after GPS coordinates of the installation position of the position measuring device 3 are obtained, and under a condition where an obstacle exists at a place or at a site where measurement cannot be carried out by the position measuring device 3, e.g. on a roof of a building, or when an obstacle exists between the object to be measured, a photogrammetry is carried out by the flying vehicle system 2. In this case, positional information to control the flight of the flying vehicle system 2 is acquired by the position measuring device 3.

[Measurement Mode 4]

In a case where the measurement is carried out over a wide range or at a complicated place by using a plurality of position measuring devices 3, or in a case where the measurement is carried out on an object to be measured (a building) with complicated shape, a plurality of position measuring devices 3 are installed at places which are most suitable for the measurement, measurement is carried out from each of the installation positions respectively, and GPS coordinates of the installation position of the position measuring device 3 are measured by the GPS device 8 of the flying vehicle system 2.

According to the present embodiment, since it is possible to obtain GPS coordinates at arbitrary positions by using the GPS device of the flying vehicle system 2, it becomes possible to easily perform measurement at a place where absolute coordinates or GPS coordinates of the installation position of the position measuring device 3 cannot be obtained or are difficult to obtain. Further, since the measurement result of the position measuring device 3 is enabled to convert to GPS coordinates, the position measuring devices 3 is capable of being installed at a plurality of places and the results of measurement can be easily integrated, and the measurement results obtained by photogrammetry can be easily integrated with the measurement results obtained by the position measuring device 3.

In the embodiment as described above, a photogrammetry is performed as measurement by the flying vehicle system 2, while other measuring devices may be mounted on board of the flying vehicle system 2. For instance, a laser scanner may be mounted as a shape measuring device so as to obtain a point group data of the object to be measured, or a spectral camera may be mounted for the purpose of investigating geological features or growing condition of agricultural products.

The invention claimed is:

1. A measuring system, comprising a remotely controllable flying vehicle system with a GPS device and a measuring device installed thereon, a position measuring device installed at an arbitrary position and configured to measure distance and angle and configured to track, a ground base station for controlling a flight of said flying vehicle system, a remote controller able to give and take data to and from said ground base station and able to perform wireless communication to and from said flying vehicle system, and control units provided on said flying vehicle system and said ground base station, wherein said flying vehicle system has a retro-reflector as an object to be measured and said position measuring device is constructed so as to track said retro-reflector and perform distance measurement and angle measurement, wherein said flying vehicle system obtains GPS coordinates by said GPS device at least at two points during flight, said position measuring device measures positions of said two points of said flying vehicle system from an installation point, wherein the position measuring device measures positions of the flying vehicle system at the two points from the installation point, and either one of said control units is configured so as to obtain an absolute coordinate or GPS coordinate of the installation point of said position measuring device based on said GPS coordinates of said two points and based on distance measurement results and on angle measurement results by said position measuring device.

2. The measuring system according to claim 1, wherein said control unit controls the flight of said flying vehicle system based on said absolute coordinates or on said GPS coordinates.

3. The measuring system according to claim 2, wherein said measuring device is a shape measuring device for measuring a shape of an object to be measured, and said control unit obtains coordinates of the shape of said object to be measured based on a shape of an object to be measured obtained by said shape measuring device at a measuring position and based on absolute coordinates of said measuring position obtained by converting measurement results of said position measuring device or on GPS coordinates obtained by said GPS device.

4. The measuring system according to claim 2, wherein said measuring device is a camera, and said control unit performs photogrammetry on an object to be measured based on an image of the object to be measured acquired by said camera at least at two points during flight, and based on absolute coordinates or GPS coordinates of said two points obtained by converting measurement results of said position measuring device or based on absolute coordinates or GPS coordinates of said two points obtained by said GPS device.

5. The measuring system according to claim 1, wherein said position measuring device is installed at two or more arbitrary points, said control unit obtains absolute coordinates or GPS coordinates of each of the installation points of said position measuring device, performs measurement by said position measuring device from each of the installation points, converts the obtained measurement results to absolute coordinates or GPS coordinates respectively and integrates the measurement results obtained by the measurement from each of the installation points.

6. The measuring system according to claim 1, wherein said measuring device of said flying vehicle system determines a dead angle range of said position measuring device, said position measuring device measures a range where it is impossible to fly of said flying vehicle system or a range where it is impossible to perform positional measurement by said GPS device, said control unit converts the measurement results of said position measuring device to GPS coordinates or absolute coordinates and integrates the results measured by said measuring device of said flying vehicle system and the result of measurement by said position measuring device.

* * * * *